US 8,503,853 B2

(12) United States Patent
Maeda et al.

(10) Patent No.: US 8,503,853 B2
(45) Date of Patent: Aug. 6, 2013

(54) PLASTIC OPTICAL FIBER AND PLASTIC OPTICAL FIBER CODE

(75) Inventors: Hironobu Maeda, Nagoya (JP); Keiichi Maeshima, Nagoya (JP); Shinji Sato, Nagoya (JP); Yoshiyuki Kiriyama, Urayasu (JP); Hidekazu Kunieda, Urayasu (JP)

(73) Assignee: Toray Industries, Inc. (JP)

( * ) Notice: Subject to any disclaimer, the term of this patent is extended or adjusted under 35 U.S.C. 154(b) by 163 days.

(21) Appl. No.: 13/260,624

(22) PCT Filed: Mar. 17, 2010

(86) PCT No.: PCT/JP2010/054502
§ 371 (c)(1),
(2), (4) Date: Oct. 3, 2011

(87) PCT Pub. No.: WO2010/113639
PCT Pub. Date: Oct. 7, 2010

(65) Prior Publication Data
US 2012/0020637 A1    Jan. 26, 2012

(30) Foreign Application Priority Data

Mar. 31, 2009 (JP) ................................. 2009-084770
May 26, 2009 (JP) ................................. 2009-126210

(51) Int. Cl.
*G02B 6/00*    (2006.01)

(52) U.S. Cl.
USPC ............................................ 385/145; 385/141

(58) Field of Classification Search
None
See application file for complete search history.

(56) References Cited

U.S. PATENT DOCUMENTS

| 6,621,977 | B2 * | 9/2003 | Irie et al. ............... 385/143 |
| 8,023,789 | B2 * | 9/2011 | Aoyagi et al. .......... 385/128 |
| 2003/0021576 | A1 * | 1/2003 | Irie et al. ............... 385/143 |
| 2003/0044136 | A1 * | 3/2003 | Nakamura et al. ..... 385/102 |
| 2012/0243842 | A1 * | 9/2012 | Lin et al. ............... 385/123 |

FOREIGN PATENT DOCUMENTS

| EP | 0 092 675 A1 | 11/1983 |
| JP | 58-164609 A | 9/1983 |
| JP | 2001-074944 A | 3/2001 |
| WO | 98/10000 A1 | 3/1998 |
| WO | 98/58973 A1 | 12/1998 |

* cited by examiner

*Primary Examiner* — Sung Pak
(74) *Attorney, Agent, or Firm* — DLA Piper LLP (US)

(57) ABSTRACT

A plastic optical fiber comprising a core and a cladding, wherein the cladding comprises at least one layer, and the cladding comprises a copolymer which comprises 10 to 35% by weight of ethylene, 45 to 69% by weight of tetrafluoroethylene, 20 to 45% by weight of hexafluoropropylene, and 0.01 to 10% by weight of a fluorovinyl compound represented by Formula (1): $CH_2=CX_1(CF_2)_nX_2$ (wherein $X_1$ represents a fluorine atom or a hydrogen atom, $X_2$ represents a fluorine atom, a hydrogen atom, or a hydrocarbon group, and n represents an integer from 1 to 10) as a copolymer component.

24 Claims, No Drawings

PLASTIC OPTICAL FIBER AND PLASTIC OPTICAL FIBER CODE

RELATED APPLICATIONS

This is a §371 of International Application No. PCT/JP2010/054502, with an international filing date of Mar. 17, 2010 (WO 2010/113639 A1, published Oct. 7, 2010), which is based on Japanese Patent Application Nos. 2009-084770, filed Mar. 31, 2009, and 2009-126210, filed May 26, 2009, the subject matter of which is incorporated by reference.

TECHNICAL FIELD

This disclosure relates to a plastic optical fiber and a plastic optical fiber cord. In particular, the disclosure relates to a plastic optical fiber and a plastic optical fiber cord which have such a level of heat resistance to withstand the use at an actual use temperature of 105° C., and therefore are useful for house wiring or automotive interior wiring.

BACKGROUND

From the viewpoint of processability, handlability, and production cost, etc., a plastic optical fiber is more favorable than a glass-based optical fiber, and thus it is suitably used for short-distance optical communication transmission, photoelectric sensor, and light guide, etc.

Recently, as automotive interior wiring for information communication, a plastic optical fiber cord containing a plastic optical fiber coated with a thermoplastic resin such as nylon (polyamide) is used.

When used for house wiring or automotive communication wiring, the plastic optical fiber cord is often installed in a small area with high temperature and high humidity condition in a bending manner, thus properties such as heat resistance, wet heat resistance, folding resistance, and bending loss resistance are required therefor.

In particular, since the temperature around the wiring in the roof or engine room of an automobile is high, i.e., about 100° C., a plastic optical fiber cord satisfying long-term resistance to heat as such high temperature of 100 to 105° C. has been waited for.

The plastic optical fiber cord is generally attached with a connector on its end and used. Since a bare (unjacketed) plastic optical fiber can easily receive a scratch when the coating layer on the surface of a plastic optical fiber cord is stripped, a method of attaching and fixing a connector part while maintaining the coating layer is employed. When a coating layer is attached and fixed on a connector part, it is necessary to increase adhesion between the bare (unjacketed) plastic optical fiber and the coating layer as well as heat resistance to maintain the connectivity strength between the connector and the plastic optical fiber cord.

The plastic optical fiber cord is constituted of two kinds of polymers, i.e., a core and a cladding. Conventionally, a polymer such as polymethyl methacrylate (herein below, it may be abbreviated as PMMA) having excellent transparency and good weather resistance has been used for the core. Meanwhile, to store light inside the core, it is required for a cladding to have lower refractive index than the core, and a fluorine-containing polymer is widely used for a cladding.

There is conventional technology for improving heat resistance of a plastic optical fiber cord by using PMMA as a core.

A plastic optical fiber cord using an α-fluoroacrylate copolymer as a cladding material, which is non-crystalline and has high glass transition temperature, and using nylon 12, polypropylene or the like as a coating material is known. However, the cladding material based on α-fluoroacrylate copolymer is very expensive. Further, as the transparency of the cladding material itself is poor, initial transmission loss is also bad. Still further, as the interface adhesion with a core is poor, there is a problem that mechanical properties such as folding resistance are not good.

Further, a plastic optical fiber cable obtained by coating the outer periphery of an unjacketed plastic optical fiber with a coating layer comprising polyamide resin composition, wherein the first cladding comprises a polymer having 15 to 90% by weight of fluoroalkyl(meth)acrylate unit (A) and 10 to 85% by weight of other copolymerizable monomer unit (B) and the second cladding comprises a fluorine-containing olefin resin having a tetrafluoroethylene unit, is known. However, the fluoroalkyl(meth)acrylate copolymer, which is used as a cladding material of a plastic optical fiber, is highly expensive and has poor interface adhesion with a core, and therefore there is a problem that mechanical properties such as folding resistance are not good.

Further, a plastic optical fiber cable obtained by forming on the outer periphery of an unjacketed plastic optical fiber a coating layer comprising nylon 12, wherein the core comprises PMMA and the cladding comprises a terpolymer having 40 to 62 mol % of a vinylidene fluoride unit, 28 to 40 mol % of a tetrafluoroethylene unit, and 8 to 22 mol % of a hexafluoropropylene unit, is known. However, the plastic optical fiber wherein the cladding material comprises the terpolymer of vinylidene fluoride, tetrafluoroethylene, and hexafluoropropylene has a problem that it has poor long-term heat resistance and poor wet heat resistance.

Further, an optical fiber cable obtained by forming on the outer periphery of an optical fiber a coating layer comprising a thermoplastic resin, wherein the core comprises PMMA and the cladding comprises a terpolymer having 5 to 30% by weight of an ethylene unit, 40 to 75% by weight of a tetrafluoroethylene unit, and 15 to 50% by weight of a hexafluoropropylene unit, is known (Japanese Patent Application Laid-Open (JP-A) No. 2001-074944). However, the ethylene/tetrafluoroethylene/hexafluoropropylene copolymer used as a cladding material has a problem that it has poor heat resistance at temperature condition of 105° C. and it cannot withstand at all for the use at a temperature of 105° C.

It could therefore be helpful to provide a plastic optical fiber and a plastic optical fiber cord having such a level of heat resistance that they can withstand the use at an actual use temperature of 105° C.

SUMMARY

We provide a plastic optical fiber containing a core and a cladding, wherein the cladding comprises at least one layer, and the cladding comprising a copolymer which comprises 10 to 35% by weight of ethylene, 45 to 69% by weight of tetrafluoroethylene, 20 to 45% by weight of hexafluoropropylene, and 0.01 to 10% by weight of a fluorovinyl compound represented by Formula (1):

$$CH_2=CX_1(CF_2)_nX_2 \qquad (1)$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component.

We also provide a plastic optical fiber cord comprising at least one more coating layer on the outer periphery of the cladding of the plastic optical fiber containing a core and a cladding, wherein the cladding comprises at least one layer, and the cladding comprising a copolymer which comprises 10 to 35% by weight of ethylene, 45 to 69% by weight of tetrafluoroethylene, 20 to 45% by weight of hexafluoropropylene, and 0.01 to 10% by weight of a fluorovinyl compound represented by Formula (1):

$$CH_2=CX_1(CF_2)_nX_2 \quad (1)$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component.

The plastic optical fiber and plastic optical fiber cord can maintain good heat resistance and dimension stability for long period of time at an actual use temperature of 105° C.

With regard to a plastic optical fiber cord used for control part of an automobile, e.g., steering, brake, ABS unit, transmission, engine and the like, the temperature is increased to nearby 100° C. at the control part. In this regard, the plastic optical fiber and the plastic optical fiber cord can maintain heat resistance with light quantity reduction of −1.0 dB or less in particular and dimension stability with pistoning of ±0.5 mm or less at an actual use temperature of 105° C. Further, the plastic optical fiber and the plastic optical fiber cord have a good balance among wet heat resistance, bending loss, flexibility and the like, and therefore are suitable for automotive interior wiring.

The plastic optical fiber and the plastic optical fiber cord have excellent pistoning properties, and therefore are suitable for house wiring.

DETAILED DESCRIPTION

The plastic optical fiber has a core and a cladding comprising at least one layer.

The core of the plastic optical fiber is preferably a (co) polymer having methyl methacrylate (herein below, it may be also abbreviated as MMA) as a main component. The (co) polymer as used herein means both a polymer and a copolymer.

The core of the plastic optical fiber contains a copolymer in which polymethyl methacrylate (PMMA) or MMA is contained in an amount of 70% by weight or more. Examples of the core of the plastic optical fiber include a copolymer such as (meth)acrylic acid ester, (meth)acrylic acid, (substituted) styrene, and (N-substituted) maleimide; a modified polymer obtained by their polymerization such as glutaric anhydride and glutaric imide; and the like. The (meth)acrylic acid ester as used herein means both acrylic acid ester and methacrylic acid ester. These copolymer components may be used in plural, and also components other than them may be used in a small amount.

Examples of the (meth)acrylic acid ester that is preferably used for the core of the plastic optical fiber include methyl acrylate, ethyl acrylate, ethyl methacrylate, butyl methacrylate, t-butyl methacrylate, cyclohexyl methacrylate, benzyl methacrylate, phenyl methacrylate, bornyl methacrylate, adamantyl methacrylate, and the like. Examples of the substituted styrene include methyl styrene, α-methyl styrene, and the like.

Examples of the N-substituted maleimide that is preferably used for the core of the plastic optical fiber include N-isopropyl maleimide, N-cyclohexyl maleimide, N-methyl maleimide, N-ethyl maleimide, N-o-methylphenyl maleimide, and the like.

In the core of the plastic optical fiber, a stabilizer such as anti-oxidant may be included in an amount that does not adversely affect the light transmitting property.

It is most preferable that the core of the plastic optical fiber is substantially composed of PMMA, in terms of productivity, light transmitting property, and resistance to environmental influence and the like.

In the plastic optical fiber, the cladding comprises at least one layer, and preferably two or more layers. More preferably, it comprises two or three layers, and most preferably it comprises two layers.

When the cladding comprises one layer, thickness of the cladding layer is preferably 2 to 20 μm and particularly preferably 5 to 15 μm. When the cladding comprises two layers, each thickness of the first and the second claddings is preferably 2 to 10 μm, and particularly preferably the total thickness of the first and the second claddings is 5 to 15 μm. When the cladding comprises three layers, each thickness of the first, the second, and the third claddings is preferably 2 to 7 μm, and particularly preferably the total thickness of the first, the second, and the third claddings is 5 to 15 μm.

With regard to the plastic optical fiber, it is necessary that at least one layer of the cladding comprises a copolymer which comprises 10 to 35% by weight of ethylene, 45 to 69% by weight of tetrafluoroethylene, 20 to 45% by weight of hexafluoropropylene, and 0.01 to 10% by weight of a fluorovinyl compound that is represented by Formula (1):

$$CH_2=CX_1(CF_2)_nX_2 \quad (1)$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component.

In particular, to improve adhesion to the core and heat resistance of the plastic optical fiber, it is necessary that the fluorovinyl compound represented by Formula (1) above is contained in an amount of 0.01 to 10% by weight.

If the fluorovinyl compound represented by Formula (1) above is not contained in an amount of 0.01 to 10% by weight and the composition including 10 to 35% by weight of ethylene, 45 to 69% by weight of tetrafluoroethylene, and 20 to 45% by weight of hexafluoropropylene is not satisfied, the plastic optical fiber having good performance and good mechanical properties such as low refractive index, low crystallinity (colorlessness and transparency), adhesion to core, heat resistance, and folding resistance cannot be obtained.

The copolymer which comprises 10 to 35% by weight of ethylene, 45 to 69% by weight of tetrafluoroethylene, 20 to 45% by weight of hexafluoropropylene, and 0.01 to 10% by weight of the fluorovinyl compound represented by the formula below:

$$CH_2=CX_1(CF_2)_nX_2$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component preferably has 100% by weight in total of ethylene, tetrafluoroethylene, hexafluoropropylene, and the fluorovinyl compound represented by the formula below:

$$CH_2=CX_1(CF_2)_nX_2$$

(wherein $X_1$ represents a fluorine atom or a hydrogen atom, $X_2$ represents a fluorine atom, a hydrogen atom, or a hydrocarbon group, and n represents an integer from 1 to 10).

In particular, when the fluorovinyl compound represented by Formula (1):

$$CH_2=CX_1(CF_2)_nX_2 \quad (1)$$

is a compound represented by Formula (2):

$$CH_2=CF(CF_2)_3H \quad (2)$$

productivity of the plastic optical fiber is improved, and the plastic optical fiber that is excellent in cost, environmental influence, and product quality.

When the cladding of the plastic optical fiber comprises one layer, it is preferable that the cladding comprises a resin having lower refractive index than that of core, and the theoretical numerical aperture (NA) that is calculated from the refractive indexes of the core and the cladding is from 0.45 to 0.65. The theoretical numerical aperture is expressed as the difference between the refractive index of the core and the refractive index of the cladding as described by the following equation:

Numerical aperture=((refractive index of core)$^2$−(refractive index of cladding($^2$))$^{1/2}$.

The numerical aperture of the plastic optical fiber that includes PMMA as core and has been commercialized so far is around 0.45 to 0.65, and by having the numerical aperture of 0.45 to 0.65, compatibility with peripheral components such as commercially available light receiving element can be maintained.

When the cladding comprises one layer, the copolymer of the cladding is preferably a copolymer which has a carbonyl group-containing functional group on the terminal or side chain of a polymer. When a copolymer of the cladding has a carbonyl group-containing functional group on the terminal or side chain of a polymer, the adhesion to core and adhesion to the coating layer are further improved.

When the cladding comprises two or more layers, the copolymer of the outermost layer of the cladding is preferably a copolymer which has a carbonyl group-containing functional group on the terminal or side chain of a polymer. When a copolymer of the outermost layer of the cladding has a carbonyl group-containing functional group on the terminal or side chain of a polymer, the adhesion to the coating layer is further improved.

Regarding the copolymer which has a carbonyl group-containing functional group on the terminal or side chain of a polymer, the carbonyl group-containing functional group means a carbonate group typically having —OC(=O)O— bond or a carboxylic halide having a structure of —COY [Y represents a halogen atom]. In particular, a carbonate group containing a fluorine (RF—O—C(=O)—RF') or a carboxylic fluoride group (—C(=O)F) is preferable. Herein, RF and RF' means a functional group containing a fluorine atom, for example, a fluoroalkyl group or a vinylidene fluoride group.

To obtain a fluorine-containing ethylenic polymer which has a carbonyl group-containing functional group on the terminal or side chain of a polymer, various methods can be used. From the viewpoint of economic feasibility, heat resistance and chemical resistance, a method of using peroxycarbonate-based peroxide as a polymerization initiator is preferably used.

Examples of the peroxycarbonate that is used for introducing a carbonyl group-containing functional group to the terminal or side chain of a polymer include di-n-propylperoxydicarbonate, t-butyl peroxyisopropylcarbonate, bis(4-t-butylcyclohexyl)peroxydicarbonate, di-2-ethylhexylperoxydicarbonate, and the like.

Herein below, the plastic optical fiber in which the cladding comprising two or more layers is contained will be explained.

For a plastic optical fiber in which the cladding comprises two or more layers, the cladding comprising a copolymer which comprises 10 to 35% by weight of ethylene, 45 to 69% by weight of tetrafluoroethylene, 20 to 45% by weight of hexafluoropropylene, and 0.01 to 10% by weight of the fluorovinyl compound represented by the formula below:

$$CH_2=CX_1(CF_2)_nX_2$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component may be used as the outmost layer of the cladding as well as the innermost layer of the cladding.

When the cladding comprising a copolymer which comprises 10 to 35% by weight of ethylene, 45 to 69% by weight of tetrafluoroethylene, 20 to 45% by weight of hexafluoropropylene, and 0.01 to 10% by weight of the fluorovinyl compound represented by the formula below:

$$CH_2=CX_1(CF_2)_nX_2$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component is used as the outmost layer of the cladding, it is preferable that the innermost layer of the cladding is a cladding comprising a copolymer which has fluorovinylidene and tetrafluoroethylene units as a copolymer component. When the innermost layer of the cladding comprises=the copolymer which has vinylidene fluoride and tetrafluoroethylene units as a copolymer component, folding resistance and chemical resistance of the plastic optical fiber are further improved, and therefore adhesion to core or other layer of cladding is enhanced more.

When the cladding comprising a copolymer which comprises 10 to 35% by weight of ethylene, 45 to 69% by weight of tetrafluoroethylene, 20 to 45% by weight of hexafluoropropylene, and 0.01 to 10% by weight of the fluorovinyl compound represented by the formula below:

$$CH_2=CX_1(CF_2)_nX_2$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component is used as the innermost layer of the cladding, it is preferable that the outermost layer of the cladding is a cladding comprising a copolymer which has vinylidene fluoride and tetrafluoroethylene units as a copolymer component. When the outermost layer of the cladding comprises the copolymer which has vinylidene fluoride and tetrafluoroethylene units as a copolymer component, folding resistance and chemical resistance of the plastic optical fiber are further improved, and therefore adhesion to the coating layer is enhanced more.

Preferred examples of the copolymer which has vinylidene fluoride and tetrafluoroethylene units include (1) a copolymer which comprises 35 to 60% by weight of vinylidene fluoride, 35 to 60% by weight of tetrafluoroethylene, and 5 to 30% by weight of hexafluoropropylene as a copolymer component; (2) a copolymer which comprises 10 to 35% by weight of vinylidene fluoride, 45 to 75% by weight of tetrafluoroethylene, 10 to 30% by weight of hexafluoropropylene, and 1 to 10% by weight of perfluoroalkyl vinyl ether as a copolymer component; (3) a copolymer which comprises 65 to 85% by weight of vinylidene fluoride and 15 to 35% by weight of tetrafluoroethylene as a copolymer component; and the like.

Examples of the perfluoroalkyl vinyl ethers include $CF_2=CFOCF_3$, $CF_2=CFOCF_2CF_3$, $CF_2=CFOCF_2CF_2CF_3$, $CF_2=CFOCH_2CF_3$, $CF_2=CFOCH_2CF_2CF_3$, $CF_2=CFOCH_2CF_2CF_2CF_3$, $CF_2=CFOCH_3$, $CF_2=CFOCH_2CH_3$, and the like. From the viewpoint of reducing the cost of raw materials, particularly preferred examples of the perfluoroalkyl vinyl ethers include a compound unit selected from a group consisting of $CF_2=CFOCF_3$, $CF_2=CFOCF_2CF_3$, and $CF_2=CFOCF_2CF_2CF_3$.

The copolymer having vinylidene fluoride and tetrafluoroethylene units is preferably a copolymer which comprises 13 to 30% by weight of vinylidene fluoride, 50 to 70% by weight of tetrafluoroethylene, 13 to 27% by weight of hexafluoropropylene, and 2 to 8% by weight of perfluoroalkyl vinyl ether as a copolymer component. More preferably, it is a copolymer which comprises 16 to 25% by weight of vinylidene fluoride, 55 to 65% by weight of tetrafluoroethylene, 16 to 22% by weight of hexafluoropropylene, and 2 to 6% by weight of perfluoroalkyl vinyl ether as a copolymer component.

Further, the copolymer having vinylidene fluoride and tetrafluoroethylene units is preferably a copolymer which comprises 35 to 55% by weight of vinylidene fluoride, 35 to 50% by weight of tetrafluoroethylene, and 5 to 15% by weight of hexafluoropropylene as a copolymer component, or a copolymer which comprises 70 to 80% by weight of vinylidene fluoride and 20 to 30% by weight of tetrafluoroethylene as a copolymer component.

When the cladding comprising a copolymer which comprises 10 to 35% by weight of ethylene, 45 to 69% by weight of tetrafluoroethylene, 20 to 45% by weight of hexafluoropropylene, and 0.01 to 10% by weight of the fluorovinyl compound represented by the formula below:

$$CH_2=CX_1(CF_2)_nX_2$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component is used as the outermost layer of the cladding, it is preferable that the innermost layer of the cladding comprises a copolymer which has a perfluoroalkyl methacrylate unit. When the innermost layer of the cladding comprises the copolymer which has perfluoroalkyl methacrylate unit, thermal characteristics, e.g., heat resistance and wet heat resistance, of the plastic optical fiber are further improved.

As for the copolymer which has a perfluoroalkyl methacrylate unit, a copolymer which comprises 60 to 95% by weight of the perfluoroalkyl methacrylate described below, $$CH_2=C(CH_3)-COO(CH_2)_m(CF_2)_nR$$

(wherein R represents a fluorine atom or a hydrogen atom, m is 1 or 2, and n represents an integer from 1 to 10), and 5 to 40% by weight of methyl methacrylate as a copolymer component is preferable in terms of transparency and heat resistance.

The perfluoroalkyl methacrylate described below:

$$CH_2=C(CH_3)-COO(CH_2)_m(CF_2)_nR$$

(wherein R represents a fluorine atom or a hydrogen atom, m is 1 or 2, and n represents an integer from 1 to 10) is favorable in that the copolymer does not undergo any clouding or yellowing, has good mechanical properties, and when it is prepared as the plastic optical fiber, it shows good light transmitting property, heat resistance, folding resistance and the like.

More preferably, with regard to the plastic optical fiber, the copolymer which has a perfluoroalkyl methacrylate unit is a copolymer which comprises 60 to 95% by weight of the perfluoroalkyl methacrylate described below:

$$CH_2=C(CH_3)-COOCH_2(CF_2)_nR$$

(wherein R represents a fluorine atom or a hydrogen atom and n represents an integer from 1 to 4) and 5 to 40% by weight of methyl methacrylate as a copolymer component.

Perfluoroalkyl methacrylate, preferably used herein, may copolymerize (meth)acrylic acid esters other than MMA, methacrylic acid having an alicyclic hydrocarbon in the ester, (meth)acrylic acid, (substituted) styrene, (N-substituted) maleimide, or the like within around 10% by weight or less.

Melt flow rate (herein below, it may be abbreviated as MFR) value of the cladding used for the plastic optical fiber is generally preferably from 10 to 100 g/10 min (condition: temperature 265° C., load 5 kg, orifice diameter 2 mm, length 8 mm). Particularly preferred range of the MFR is from 20 to 60 g/10 min. When MFR is from 10 to 100 g/10 min, extrusion becomes easier so that spinning can be smoothly carried out. Further, when MFR is from 10 to 100 g/10 min, adhesion to core or multi-layer cladding can be maintained at an appropriate level and favorable eccentricity can be obtained so that variation in outer diameter of the plastic optical fiber is inhibited.

The outer diameter of the plastic optical fiber is generally from 0.1 to 3 mm or so. Further, from the viewpoint of strength for wiring for an automobile interior, handlability and the like, the diameter of the core is preferably from 0.7 to 1.5 mmφ.

A plastic optical fiber cord further comprises at least one coating layer coated on the outer periphery of the cladding of the plastic optical fiber. The plastic optical fiber cord is preferably coated with one or more to three or less coating layers.

When one coating layer is coated, thickness of the coating layer is preferably 0.05 mm to 3.0 mm, and particularly preferably 0.1 mm to 1.5 mm. When two coating layer are coated, each thickness of the first coating layer and the second coating layer is preferably 0.05 mm to 1.0 mm, and particularly preferably the total thickness of the first coating layer and the second coating layer is 0.1 mm to 1.5 mm.

The coating layer preferably has a thermoplastic resin as a main component. Preferred examples of the thermoplastic resin that can be used include a polyolefin resin such as polyethylene and polypropylene, or their copolymer, mixed product, an olefin elastomer containing a organic silane group, a polyamide resin such as nylon 12, a polyamide elastomer, an ethylene-vinyl acetate copolymer, polyvinyl chloride, polyfluorovinylidene, a polyester resin, a polyester elastomer, or a polyurethane elastomer resin, a fluorinated resin, a cross-linked polyolefin, and the like. In particular, polyamide resin or polyolefin resin is preferably used as a coating layer.

In particular, when a resin having a polyamide resin or polypropylene as a main component is used as a coating layer, oil resistance, wear resistance, heat resistance, impact resistance, and the like are improved, and therefore it is favorable for automotive interior wiring. In particular, when the polyamide resin is used as a coating layer, adhesion to the cladding material in the outermost layer is further enhanced so that pistoning is inhibited, and therefore especially desirable.

The polyamide resin used herein means a homopolymer such as nylon 6, nylon 66, nylon 10, nylon 11, and nylon 12, or a copolymer or a polymer blend which contains these monomers in an amount of 50% by weight or more. It may also contain, in addition to a plasticizer and a flame retardant, a stabilizing agent such as an anti-oxidant, an anti-aging agent, and a UV stabilizing agent, or carbon black, a pigment, and a dye for coloration.

The resin having polypropylene as a main component means a copolymer containing cross-linking with polypropylene, polyethylene or the like, or their mixture, and the resin may also contain, in addition to a flame retardant, a stabilizing agent such as an anti-oxidant, an anti-aging agent, and a UV stabilizing agent, or a pigment for coloration. As for the resin having polypropylene as a main component, a commercially available product having characteristics such as extension yield strength of 20 to 35 MPa (ASTMD638), bending elasticity of 1.1 to 1.7 GPa (ASTM D790), Rockwell hardness (R) of 80 to 110 (JIS-K7202), and deflection temperature under load of 105 to 130° C. (JIS-K7207, 0.45 MPa) can be used.

The plastic optical fiber cord preferably has a single-layer coating structure having only one coating layer, or a double-layer coating structure having the first coating layer and the second layer in which the second coating layer is further coated on the outer periphery of the coating layer.

The plastic optical fiber cord with a single-layer coating structure in which only one coating layer is included is explained below.

The coating layer of the plastic optical fiber cord with a single-layer coating structure is preferably a resin having a polyamide resin or polypropylene as a main component. More preferably, it is a resin having polypropylene as a main component.

The plastic optical fiber cord with a double-layer coating structure in which the first coating layer and the second layer are included is explained below.

For the plastic optical fiber cord having a double-layer coating structure, when a resin having a polyamide resin as a main component is used as an innermost layer, i.e., the first coating layer, oil resistance, wear resistance, heat resistance, and impact resistance are improved and it is favorable for automotive interior wiring, and therefore desirable.

More preferably, for the first coating layer of the plastic optical fiber cord, a resin having nylon 12 as a main component is used.

The resin having nylon 12 as a main component means a homopolymer such as nylon 12, or a copolymer or a polymer blend which contains these monomers in an amount of 50% by weight or more. It may also contain, in addition to a plasticizer and a flame retardant, a stabilizing agent such as an anti-oxidant, an anti-aging agent, and a UV stabilizing agent, carbon black, a pigment, and a dye for coloration, or the like. The resin having nylon 12 as a main component can use a commercially available product having characteristics such as bending elasticity of 1.0 to 2.0 GPa, extension yield strength of 30 to 55 MPa, and deflection temperature under load of 135 to 150° C. (0.45 MPa).

For the plastic optical fiber cord, it is preferable that the second coating layer is more flexible than the first coating layer.

For the plastic optical fiber cord having a double-layer coating structure in which the first coating layer and the second layer are included, a copolymer with other nylons such as nylon 12 and nylon 6 containing a plasticizer or a polyamide elastomer which is a block copolymer with polyether, polyester, or the like can be preferably used as an outermost layer, i.e., the second coating layer. As for the second coating layer, various elastomers such as thermoplastic elastomer including polyester elastomer, polyolefin elastomer, polyurethane elastomer, polystyrene elastomer, and the like, polyvinyl chloride, or an ethylene copolymer with acrylate or vinyl acetate may be also used. The second coating layer preferably comprises polyamide and/or a thermoplastic elastomer. The second coating layer may also contain, in addition to a flame retardant, a stabilizing agent such as an anti-oxidant, an anti-aging agent, and a UV stabilizing agent, carbon black, a pigment, and a dye for coloration, or the like. A tension member such as Kevlar may be further incorporated to a space next to the first coating layer.

The coating layer will be explained below in terms of the performance and use of the plastic optical fiber cord.

For the plastic optical fiber cord to exhibit a sufficient performance in a roof or an engine room of an automobile, heat resistance is particularly required in addition to oil resistance, wear resistance, and impact resistance. For the coating layer applied on the outer periphery of the plastic optical fiber to have satisfactory oil resistance, wear resistance, impact resistance, and heat resistance, and also to have less thermal decomposition or molecular movement at high temperature of 105° C. and to have the pistoning of ±0.5 mm or less after heat treatment at 105° C. for 24 hours at 50 cm length, it is important to improve the adhesion to the outermost layer of cladding. To accomplish this, it is necessary to strengthen the affinity and interaction between them.

Further, it is important to improve the adhesion to the outermost layer of cladding for the plastic optical fiber cord used in a roof or an engine room of an automobile so that the coating layer applied on the outer periphery of the plastic optical fiber preferably has adhesion force of 30 N or more to the coating layer at 30 mm length. To accomplish this, it is desirable to strengthen the affinity and interaction between them.

From this point of view, for the plastic optical fiber cord used in a roof or an engine room of an automobile, a polyamide resin, a polyolefin resin, a polyester elastomer, a polyolefin elastomer, or a cross-linked polyolefin is preferably used as a coating layer. Examples of the polyolefin resin include polyethylene, polypropylene, polyisobutylene, polybutadiene, and the like. Of these, the polyamide resin, polypropylene, and their copolymer, and a resin which contains their mixture as a main component are particularly preferably used.

For the plastic optical fiber cord used for automotive interior communication, a resin which contains nylon 12 or polypropylene as a main component is preferably used as a coating layer. From the view point of oil resistance, wear resistance, heat resistance, and impact resistance that are the characteristics required for the use of automotive interior communication, it is particularly preferable to use nylon 12.

When the plastic optical fiber cord has three or more coating layers, the innermost coating layer is preferably a coating layer which contains polyamide as a main component. The outermost coating layer is preferably a coating layer which contains polyamide and/or a thermoplastic elastomer as a main component.

For the plastic optical fiber cord, it is preferable that pistoning at 50 cm length after heat treatment at 105° C. for 24 hours is ±0.5 mm or less. Pistoning indicates a state of change in shape of a plastic optical fiber cord under heat resistant environment wherein the change is caused by thermal shrinkage of a coating layer, or protrusion or cave-in of the plastic optical fiber due to poor adhesion between the coating layer and the plastic optical fiber. The method of measuring pistoning at 50 cm length will be described in the Example section below.

When the pistoning is greater than ±0.5 mm, bad connection with a light connector may be yielded. Further, as a light receiving part and a light emitting part together are more than 1 mm, reliability of optical bonding is impaired when a ferrule for a light connector is attached and connected to a light receiving part and a light emitting part, and therefore it may become a problem. When the pistoning is ±0.5 mm or less, a light receiving part and a light emitting part together can be 1 mm or less, and therefore position accuracy within the range of tolerance can be obtained.

It is preferable that the adhesion between the coating layer and the plastic optical fiber at 30 mm length of the outer periphery of the plastic optical fiber is 30 N or more. The method of measuring adhesion between the coating layer and the plastic optical fiber at 30 mm length will be described in the Example section below.

If the adhesion force is less than 30 N, an unjacketed plastic optical fiber and a coating layer may be detached from each other, when a plastic optical fiber cord is pulled, and the cross section of the plastic optical fiber may be caved in, and therefore credibility of optical bonding is impaired. In addition, pistoning may occur according to change in environment of use, thus 30 N or more is preferable. More preferable adhesion force is 35 N or more. Particularly preferable adhesion force is 40 N or more. For the plastic optical fiber having outer diameter of 1000 μm, the adhesion force is particularly preferably from 40 to 100 N. When the adhesion force is from 40 to 100 N, the adhesion force is not greater than breaking strength of the plastic optical fiber, thus the plastic optical fiber is not broken.

Herein below, a method of producing the plastic optical fiber is explained.

The plastic optical fiber can be produced by a method of a general process. For example, conjugate spinning including forming a core-sheath structure having a double layer of core and cladding by ejecting a core material and a cladding material under heat-melting state from a conjugate spinneret for conjugation with a multi-circular shape is preferably used. Further, a conjugate spinning method of forming a core-sheath structure having a triple layer of core/first cladding/second cladding is preferably used, for example.

Subsequently, under the purpose of improving mechanical strength in general, drawing treatment to 1.2 to 3 times is performed to give a plastic optical fiber.

Herein below, a method of producing the plastic optical fiber cord is explained.

For the plastic optical fiber cord, the plastic optical fiber described above is employed as an unjacketed fiber and at least one coating layer is formed on the outer surface of the fiber to give the plastic optical fiber cord. The coating layer may be formed according to a melt-extrusion molding using a cross head die.

The plastic optical fiber preferably transported by a wire transporting machine and the like with supply tension of 50 to 1400 g is delivered to a rear end of a cross head die and a coating material in a heat-molten state, that is extruded from a die of an extruder, is melt-adhered around the plastic optical fiber, and as a result the plastic optical fiber cord is coated. Further, for the purpose of preventing deterioration of light transmitting property due to increased heat calorie received by the plastic optical fiber per unit hour, it is also possible to have a step of rapidly cooling and solidifying the coating material to form a cooling layer, once the coating material is melt-adhered around the plastic optical fiber. The cooling medium used for cooling step may be water in general. However, other cooling medium can be also used.

EXAMPLES

Herein below, our plastic optical fibers, plastic optical fiber cords and methods are explained in greater detail in view of the Examples. The evaluations were carried out according to the methods described below.

Refractive Index:
Measurement was carried out at room temperature condition of 25° C. by using an Abbe refractometer as a measurement device.

Light Transmitting Property:
With halogen parallel lights (wavelength 650 nm, incident light NA=0.25), the measurement was carried out according to 30/2 m cut back method. Result of 150 dB/km or less was provided "pass."

Cyclic Bendings Times:
Load of 500 g was applied to one end of a cord coated with the first coating, and while supporting the cord with a mandrel having diameter of 30 mmφ, the other end of the fiber was cycle Bended at 90° angle having a center at the support point, and the folding number until the breakage of the cord was measured. Cyclic Bendings number was measured five times, and the average value of 50,000 or more was provided "pass."

Heat Resistance:
In a high temperature oven (PHH-200, manufactured by TABAI ESPEC), a plastic optical fiber cord with test length of 22 m (2 m at each end is placed outside the oven) was kept for 1000 hours at 105° C. Light quantity was measured before and after the test, and the change in the light quantity was followed ("minus" indicates a decrease in light quantity). The change in the light quantity before and after the test was measured three times, and the average change in the light quantity of −1.0 dB or less was provided "pass."

Wet Heat Resistance:
Change in the light quantity before and after the test was measured three times in the same manner as the measurement of heat resistance under the condition including temperature of 85° C. and humidity of 85%. Average change in the light quantity of −1.5 dB or less was provided "pass."

Bending Loss:
Light quantity of a plastic optical fiber cord (test length: 3 m) was measured by using 660 nm LED (light emitting diode). The plastic optical fiber cord was wound 360 degrees around a metal rod with radius of 10 mm, and then the light quantity was measured. Decrease in light quantity according to take-up was measured. The decrease in light quantity was measured three times, and average decrease in light quantity of 1 dB or less was provided "pass."

Pistoning:
In a high temperature oven (PHH-200, manufactured by TABAI ESPEC), a plastic optical fiber cord with test length of 50 cm was kept for 24 hours at 105° C. Thereafter, cord section of the plastic optical fiber cord was examined before and after the test by using a small microscope (trade name: STM6, manufactured by Olympus).

When the plastic optical fiber protrudes at the tip of the coating layer, the distance from the tip of the coating layer to the tip of the protruded plastic optical fiber corresponds to a pistoning part and it is determined as − (minus). When the plastic optical fiber caves in at the tip of the coating layer, the distance from the tip of the coating layer to the tip of the caved-in plastic optical fiber corresponds to a pistoning part and it is determined as + (plus). The pistoning of ±0.5 mm or less was provided "pass."

Adhesion Force:
60 mm of the coating layer of the plastic optical fiber cord (test length 90 mm) was stripped to expose the plastic optical fiber while having 30 mm of the coating layer remained intact. The fiber was passed through a metal plate with holes having a diameter 0.1 mm larger than the diameter of the optical fiber and the fiber was pulled by using an extension tester (AUTOGRAPH AG-IS, manufactured by Shimadzu Corporation) with extension rate of 50 mm/min. The extension yield strength was measured 20 times, and the lowest value of extension yield strength was determined as adhesion force. When the extension yield strength was measured 20 times and the lowest value is 50 N or more, it was provided "pass."

Further, for the plastic optical fiber cord having a double-layer coating structure, the second coating layer was removed and 60 mm of the first coating layer was stripped off, and then the measurement was carried according to the method described above.

Resistance to Bending:

The plastic optical fiber cord (test length 100 mm) was placed perpendicular to the extension direction and picked up and pulled by using a metal jig which has been bend to have U shape. Thereafter, the cord was pulled by using an extension tester (AUTOGRAPH AG-IS, manufactured by Shimadzu Corporation) with extension rate of 5 mm/min. The extension yield strength per 1 mm when the cord is pulled by 1 cm was defined as resistance to bending. The resistance to bending was measured 10 times.

In the Examples and Comparative Examples, materials constituting the core and cladding are described as follows:

| | |
|---|---|
| PMMA: | polymethyl methacrylate |
| MMA: | methyl methacrylate |
| Et: | ethylene |
| 4FM: | 2,2,3,3-tetrafluoropropyl methacrylate |
| 5FM: | 2,2,3,3,3-pentafluoropropyl methacrylate |
| 2F: | vinylidene fluoride |
| 4F: | tetrafluoroethylene |
| 6F: | hexafluoropropylene |
| FVE: | heptafluoropropyl vinyl ether |
| Monomer A: | $CH_2=CF(CF_2)_3H$ |
| Monomer B: | $CH_2=CF(CF_2)_3CH_3$. |

All the plastic optical fiber of the Examples and Comparative Examples have fiber diameter of 1000 μm.

Example 1

As a cladding material, a copolymer (refractive index 1.368) comprising ethylene(Et)/tetrafluoroethylene(4F)/hexafluoropropylene(6F)/monomer A($CH_2=CF(CF_2)_3H$) with the composition shown in Table 1 was fed to a conjugate spinner. In addition, as a core material, the PMMA (refractive index 1.492) produced by continuous bulk polymerization was fed to the conjugate spinner, and the core and the cladding were subjected to core-sheath conjugate melt spinning at the temperature of 235° C. to obtain a plastic optical fiber with fiber diameter of 1000 μm (core diameter of 980 μm and cladding thickness of 10.0 μm).

In addition, a coating material in which 4% by weight of carbon black is added to polypropylene resin (PMB60W, manufactured by SunAllomer Ltd.) was coated onto the plastic optical fiber by using a cross head cable coating machine with cross head die having setting temperature of 180° C. As a result, a plastic optical fiber cord with the outer diameter of 2.2 mm was obtained.

The plastic optical fiber cord obtained above was evaluated according to the evaluation methods described above, and the results are given in Table 4.

Examples 2 to 5

The plastic optical fiber cord was obtained in the same manner as Example 1 except that the first cladding material is changed as shown in Table 1. The plastic optical fiber cord thus obtained was evaluated in the same manner as Example 1, and the results are given in Table 4.

Example 6

The plastic optical fiber cord was obtained in the same manner as Example 5 except that the coating material is changed to a polypropylene elastomer (SARLINK 4155, manufactured by Toyobo Co., Ltd.). The plastic optical fiber cord thus obtained was evaluated in the same manner as Example 1, and the results are given in Table 3.

Example 7

The plastic optical fiber cord was obtained in the same manner as Example 5 except that the coating material is changed to a polyester elastomer (PELPRENE P-150M, manufactured by Toyobo Co., Ltd.). The plastic optical fiber cord thus obtained was evaluated in the same manner as Example 1, and the results are given in Table 4.

Example 8

The plastic optical fiber cord was obtained in the same manner as Example 5 except that the coating material is changed to polyethylene (NUC-9109, manufactured by Dow Chemical Corp.). The plastic optical fiber cord thus obtained was evaluated in the same manner as Example 1, and the results are given in Table 4.

Example 9

The plastic optical fiber cord was obtained in the same manner as Example 5 except that the coating material is changed to a vinyl chloride resin (SHV9845P, manufactured by Riken Technos Corp.). The plastic optical fiber cord thus obtained was evaluated in the same manner as Example 1, and the results are given in Table 4.

Example 10

The plastic optical fiber cord was obtained in the same manner as Example 5 except that the coating material is changed to a polyurethane elastomer (RESAMINE P-800, manufactured by Dainichiseika Color & Chemicals Mfg. Co., Ltd.). The plastic optical fiber cord thus obtained was evaluated in the same manner as Example 1, and the results are given in Table 4.

Example 11

The plastic optical fiber cord was obtained in the same manner as Example 5 except that the coating material is changed to an ethylene-vinyl acetate copolymer (EVATATE D4040, manufactured by Sumitomo Chemical Co., Ltd.). The plastic optical fiber cord thus obtained was evaluated in the same manner as Example 1, and the results are given in Table 4.

Example 12

The plastic optical fiber cord was obtained in the same manner as Example 5 except that the coating material is changed to polyamide 12 (DAIAMID L1640, manufactured by Daicel-Evonik Ltd.). The plastic optical fiber cord thus obtained was evaluated in the same manner as Example 1, and the results are given in Table 4.

Comparative Examples 1 to 3

The plastic optical fiber cord was obtained in the same manner as Example 1 except that the first cladding material is changed as shown in Table 1. The plastic optical fiber cord thus obtained was evaluated in the same manner as Example 1, and the results are given in Table 4.

thus obtained was evaluated in the same manner as Example 1, and the results are given in Table 5.

TABLE 1

| | Core | First cladding | | First coating material | |
|---|---|---|---|---|---|
| | Composition (refractive index) | Composition (% by weight) | Refractive index | Type | Outer diameter |
| Example 1 | PMMA(1.492) | Et/4F/6F/monomer A = 12.0/62.5/25.0/0.5 | 1.368 | polypropylene | 2.2 |
| Example 2 | PMMA(1.492) | Et/4F/6F/monomer A = 30.0/48.0/21.5/0.5 | 1.401 | polypropylene | 2.2 |
| Example 3 | PMMA(1.492) | Et/4F/6F/monomer A = 19.0/49.0/24.0/8.0 | 1.373 | polypropylene | 2.2 |
| Example 4 | PMMA(1.492) | Et/4F/6F/monomer B = 18.0/52.0/29.5/0.5 | 1.381 | polypropylene | 2.2 |
| Example 5 | PMMA(1.492) | Et/4F/6F/monomer A = 18.0/52.0/29.5/0.5 | 1.380 | polypropylene | 2.2 |
| Example 6 | PMMA(1.492) | Et/4F/6F/monomer A = 18.0/52.0/29.5/0.5 | 1.380 | polypropylene elastomer | 2.2 |
| Example 7 | PMMA(1.492) | Et/4F/6F/monomer A = 18.0/52.0/29.5/0.5 | 1.380 | polyester elastomer | 2.2 |
| Example 8 | PMMA(1.492) | Et/4F/6F/monomer A = 18.0/52.0/29.5/0.5 | 1.380 | polyethylene | 2.2 |
| Example 9 | PMMA(1.492) | Et/4F/6F/monomer A = 18.0/52.0/29.5/0.5 | 1.380 | vinyl chloride resin | 2.2 |
| Example 10 | PMMA(1.492) | Et/4F/6F/monomer A = 18.0/52.0/29.5/0.5 | 1.380 | polyurethane elastomer | 2.2 |
| Example 11 | PMMA(1.492) | Et/4F/6F/monomer A = 18.0/52.0/29.5/0.5 | 1.380 | ethylene-vinyl acetate copolymer | 2.2 |
| Example 12 | PMMA(1.492) | Et/4F/6F/monomer A = 18.0/52.0/29.5/0.5 | 1.380 | polyamide 12 | 2.2 |
| Comparative Example 1 | PMMA(1.492) | Et/4F/6F = 38.0/44.0/18.0 | 1.418 | polypropylene | 2.2 |
| Comparative Example 2 | PMMA(1.492) | Et/4F/6F/monomer A = 5.0/72.0/18.0/6.0 | 1.360 | polypropylene | 2.2 |
| Comparative Example 3 | PMMA(1.492) | Et/4F/6F = 40/40/20 | 1.364 | polypropylene | 2.2 |

Example 13

As a cladding material, a copolymer (refractive index 1.351) comprising the first cladding (vinylidene fluoride (2F)/tetrafluoroethylene(4F)/hexafluoropropylene(6F)/heptafluoropropyl vinyl ether (FVE)) and a copolymer (refractive index 1.380) comprising the second cladding (ethylene(Et)/tetrafluoroethylene(4F)/hexafluoropropylene(6F)/monomer A($CH_2$=$CF(CF_2)_3H$) with the composition shown in Table 1 were fed to a conjugate spinner. In addition, as a core material, the PMMA (refractive index 1.492) produced by continuous bulk polymerization was fed to the conjugate spinner, and the core and the cladding were subjected to core-sheath conjugate melt spinning at the temperature of 235° C. to obtain a plastic optical fiber with fiber diameter of 1000 μm (core diameter of 980 μm and the first/cladding thickness, each 5.0 μm). In addition, a coating material in which 4% by weight of carbon black is added to polypropylene resin (PMB60W, manufactured by SunAllomer Ltd.) was coated onto the plastic optical fiber by using a cross head cable coating machine with cross head die having setting temperature of 180° C. As a result, a plastic optical fiber cording with the outer diameter of 2.2 mm was obtained.

The plastic optical fiber cord obtained above was evaluated in the same manner as Example 1, and the results are given in Table 5.

Examples 14 to 16

The plastic optical fiber cord was obtained in the same manner as Example 13 except that the first cladding material is changed as shown in Table 2. The plastic optical fiber cord thus obtained was evaluated in the same manner as Example 1, and the results are given in Table 5.

Example 17

The plastic optical fiber cord was obtained in the same manner as Example 16 except that the coating material is changed to polyamide 12 (DAIAMID L1640, manufactured by Daicel-Evonik Ltd.). The plastic optical fiber cord thus obtained was evaluated in the same manner as Example 1, and the results are given in Table 5.

Example 18

The plastic optical fiber cord was obtained in the same manner as Example 17 except that the first cladding material and the second cladding material are changed as shown in Table 2. The plastic optical fiber cord thus obtained was evaluated in the same manner as Example 1, and the results are given in Table 5.

Examples 19 to 22

The plastic optical fiber cord was obtained in the same manner as Example 18 except that the first cladding material is changed as shown in Table 2. The plastic optical fiber cord thus obtained was evaluated in the same manner as Example 1, and the results are given in Table 5.

Example 23

The plastic optical fiber cord was obtained in the same manner as Example 22 except that the coating material is changed to polypropylene (PMB60W, manufactured by SunAllomer Ltd.). The plastic optical fiber cord thus obtained was evaluated in the same manner as Example 1, and the results are given in Table 5.

Examples 24 to 26

The plastic optical fiber cord was obtained in the same manner as Example 22 except that the first cladding material is changed as shown in Table 2. The plastic optical fiber cord thus obtained was evaluated in the same manner as Example 1, and the results are given in Table 5.

Comparative Examples 4 to 5

The plastic optical fiber cord was obtained in the same manner as Example 13 except that the first cladding material and the second cladding material are changed as shown in Table 2. The plastic optical fiber cord thus obtained was evaluated in the same manner as Example 1, and the results are given in Table 5.

Example 27

As a cladding material, a copolymer (refractive index 1.380) composed of the first cladding (ethyl ene(Et)/tetrafluoroethylene(4F)/hexafluoropropylene(6F)/Monomer A($CH_2$=$CF(CF_2)_3H$) and a copolymer (refractive index 1.351) composed of the second cladding (vinylidene fluoride (2F)/tetrafluoroethylene(4F)/hexafluoropropylene(6F)/heptafluoropropyl vinyl ether (FVE)) with the composition shown in Table 1 were fed to a conjugate spinner.

In addition, as a core material, the PMMA (refractive index 1.492) produced by continuous bulk polymerization was fed to the conjugate spinner, and the core and the cladding were subjected to core-sheath conjugate melt spinning at the temperature of 235° C. to obtain the plastic optical fiber with fiber diameter of 1000 μm (core diameter of 980 μm and the first/cladding thickness, each 5.0 μm). To the outer surface of the plastic optical fiber obtained, the polyamide resin having extension yield strength of 40 MPa and melting temperature of 178° C. (DAIAMID L1640, manufactured by Daicel-Evonik Ltd.) was formed by melt-extrusion molding with linear rate of 50 m/min to obtain the plastic optical fiber cord having outer diameter of 1.5 mm.

TABLE 2

| | Core | First cladding | | Second cladding | | First coating material | |
|---|---|---|---|---|---|---|---|
| | Composition (refractive index) | Composition (% by weight) | Refractive index | Composition (% by weight) | Refractive index | Type | Outer diameter |
| Example 13 | PMMA (1.492) | 2F/4F/6F/FVE = 19.0/59.0/19.0/3.0 | 1.351 | Et/4F/6F/monomer A = 18.0/52.0/29.5/0.5 | 1.380 | Polypropylene | 2.2 |
| Example 14 | PMMA (1.492) | 2F/4F/6F = 40/40/20 | 1.364 | Et/4F/6F/monomer A = 18.0/52.0/29.5/0.5 | 1.380 | polypropylene | 2.2 |
| Example 15 | PMMA (1.492) | 2F/4F = 75/25 | 1.405 | Et/4F/6F/monomer A = 18.0/52.0/29.5/0.5 | 1.380 | polypropylene | 2.2 |
| Example 16 | PMMA (1.492) | 5FM/4FM/MMA = 60/20/20 | 1.419 | Et/4F/6F/monomer A = 18.0/52.0/29.5/0.5 | 1.380 | polypropylene | 2.2 |
| Example 17 | PMMA (1.492) | 5FM/4FM/MMA = 60/20/20 | 1.419 | Et/4F/6F/monomer A = 18.0/52.0/29.5/0.5 | 1.380 | polyamide 12 | 2.2 |
| Example 18 | PMMA (1.492) | Et/4F/6F/monomer A = 12.0/62.5/25.0/0.5 | 1.368 | 2F/4F/6F/FVE = 19.0/59.0/19.0/3.0 | 1.351 | polyamide 12 | 2.2 |
| Example 19 | PMMA (1.492) | Et/4F/6F/monomer A = 30.0/48.0/21.5/0.5 | 1.401 | 2F/4F/6F/FVE = 19.0/59.0/19.0/3.0 | 1.351 | polyamide 12 | 2.2 |
| Example 20 | PMMA (1.492) | Et/4F/6F/monomer A = 19.0/49.0/24.0/8.0 | 1.373 | 2F/4F/6F/FVE = 19.0/59.0/19.0/3.0 | 1.351 | polyamide 12 | 2.2 |
| Example 21 | PMMA (1.492) | Et/4F/6F/monomer B = 18.0/52.0/29.5/0.5 | 1.376 | 2F/4F/6F/FVE = 19.0/59.0/19.0/3.0 | 1.351 | polyamide 12 | 2.2 |
| Example 22 | PMMA (1.492) | Et/4F/6F/monomer A = 18.0/52.0/29.5/0.5 | 1.380 | 2F/4F/6F/FVE = 19.0/59.0/19.0/3.0 | 1.351 | polyamide 12 | 2.2 |
| Example 23 | PMMA (1.492) | Et/4F/6F/monomer A = 18.0/52.0/29.5/0.5 | 1.380 | 2F/4F/6F/FVE = 19.0/59.0/19.0/3.0 | 1.351 | polypropylene | 2.2 |
| Example 24 | PMMA (1.492) | Et/4F/6F/monomer A = 18.0/52.0/29.5/0.5 | 1.380 | 2F/4F/6F = 40/40/20 | 1.364 | polyamide 12 | 2.2 |
| Example 25 | PMMA (1.492) | Et/4F/6F/monomer A = 18.0/52.0/29.5/0.5 | 1.380 | 2F/4F = 75/25 | 1.405 | polyamide 12 | 2.2 |
| Example 26 | PMMA (1.492) | Et/4F/6F/monomer A = 18.0/52.0/29.5/0.5 | 1.380 | 5FM/4FM/MMA = 60/20/20 | 1.419 | polyamide 12 | 2.2 |
| Comparative Example 4 | PMMA (1.492) | Et/4F/6F = 38.0/44.0/18.0 | 1.418 | 2F/4F/6F/FVE = 19.0/59.0/19.0/3.0 | 1.351 | polypropylene | 2.2 |
| Comparative Example 5 | PMMA (1.492) | Et/4F/6F/monomer A = 5.0/72.0/18.0/6.0 | 1.360 | 2F/4F/6F/FVE = 19.0/59.0/19.0/3.0 | 1.351 | polypropylene | 2.2 |

Further, to the outer surface, a polyamide elastomer resin having extension yield strength of 25 MPa and melting temperature of 178° C. was formed by melt-extrusion molding with linear rate of 50 m/min to obtain the plastic optical fiber cord having outer diameter of 2.3 mm.

The plastic optical fiber cord obtained above was evaluated in the same manner as Example 1, and the results are given in Table 5.

Example 28

The plastic optical fiber cord was obtained in the same manner as Example 27 except that the first cladding material and the second cladding material are changed as shown in Table 3. The plastic optical fiber cord thus obtained was evaluated according to the evaluation method described above, and the results are given in Table 5.

Comparative Examples 6 to 8

The plastic optical fiber cord was obtained in the same manner as Example 22 except that the first cladding material and the second cladding material are changed as shown in Table 3. The plastic optical fiber cord thus obtained was evaluated in the same manner as Example 1, and the results are given in Table 5.

TABLE 3

| | Core Composition (refractive index) | First cladding Composition (% by eight) | First cladding Refractive index | Second cladding Composition (% by weight) | Second cladding Refractive index | First coating material Type | First coating material Outer diameter | Second coating material Type | Second coating material Outer diameter |
|---|---|---|---|---|---|---|---|---|---|
| Example 27 | PMMA (1.492) | Et/4F/6F/ monomer A = 18.0/52.0/29.5/0.5 | 1.380 | 2F/4F/6F/FVE = 19.0/59.0/19.0/3.0 | 1.351 | polyamide 12 | 1.5 | polyamide elastomer | 2.3 |
| Example 28 | PMMA (1.492) | 5FM/4FM/MMA = 60/20/20 | 1.419 | Et/4F/6F/monomer A = 18.0/52.0/29.5/0.5 | 1.380 | polyamide 12 | 1.5 | polyamide elastomer | 2.3 |
| Comparative Example 6 | PMMA (1.492) | 5FM/4FM/MMA = 60/20/20 | 1.419 | Et/4F/6F = 38.0/44.0/18.0 | 1.418 | polyamide 12 | 1.5 | polyamide elastomer | 2.3 |
| Comparative Example 7 | PMMA (1.492) | 5FM/4FM/MMA = 60/20/20 | 1.419 | Et/4F/6F/monomer A = 5.0/72.0/18.0/5.0 | 1.360 | polyamide 12 | 1.5 | polyamide elastomer | 2.3 |
| Comparative Example 8 | PMMA (1.492) | 5FM/4FM/MMA = 60/20/20 | 1.419 | 2F/4F/6F/FVE = 19.0/59.0/19.0/3.0 | 1.351 | polyamide 12 | 1.5 | polyamide elastomer | 2.3 |

TABLE 4

| | Light transmitting property (dB/km) | Cyclic Bending Times (times) | Heat resistance (dB) | Wet heat resistance (dB) | Bending loss (dB) | Pistoning (mm) | Adhesion force (N) | Resistance to bending (N) |
|---|---|---|---|---|---|---|---|---|
| Example 1 | 136 | >50,000 | −0.8 | −1.0 | 0.5 | 0.4 | 45 | 23 |
| Example 2 | 134 | >50,000 | −0.8 | −0.8 | 0.8 | 0.45 | 42 | 23 |
| Example 3 | 135 | >50,000 | −0.6 | −0.7 | 0.6 | 0.4 | 44 | 23 |
| Example 4 | 135 | >50,000 | −0.5 | −0.7 | 0.7 | 0.4 | 43 | 23 |
| Example 5 | 137 | >50,000 | −0.7 | −0.8 | 0.7 | 0.4 | 43 | 23 |
| Example 6 | 130 | >50,000 | −0.5 | −1.0 | 0.7 | 0.4 | 45 | — |
| Example 7 | 131 | >50,000 | −0.6 | −1.2 | 0.7 | 0.4 | 44 | 5 |
| Example 8 | 131 | >50,000 | −0.6 | −1.2 | 0.8 | 0.4 | 42 | 6 |
| Example 9 | 131 | >50,000 | −0.9 | −1.1 | 0.7 | 0.45 | 35 | 5 |
| Example 10 | 132 | >50,000 | −0.9 | −1.0 | 0.7 | 0.45 | 35 | — |
| Example 11 | 133 | >50,000 | −0.9 | −1.2 | 0.8 | 0.4 | 41 | — |
| Example 12 | 130 | >50,000 | −0.7 | −0.8 | 0.7 | 0.3 | 62 | 21 |
| Comparative Example 1 | 146 | 34,600 | −4.0 | −5.2 | 1.5 | 2.8 | 27 | 23 |
| Comparative Example 2 | 152 | 42,500 | −1.8 | −2.0 | 0.3 | 0.8 | 35 | 23 |
| Comparative Example 3 | 143 | 39,900 | −3.7 | −4.0 | 0.4 | 1.5 | 22 | 23 |

TABLE 5

| | Light transmitting property (dB/km) | Cyclic Bending Times (times) | Heat resistance (dB) | Wet heat resistance (dB) | Bending loss (dB) | Pistoning (mm) | Adhesion force (N) | Resistance to bending (N) |
|---|---|---|---|---|---|---|---|---|
| Example 13 | 132 | >50,000 | −0.6 | −0.8 | 0.5 | 0.4 | 43 | 23 |
| Example 14 | 131 | >50,000 | −0.7 | −1.0 | 0.6 | 0.4 | 43 | 23 |
| Example 15 | 130 | >50,000 | −0.9 | −1.2 | 0.8 | 0.4 | 44 | 23 |
| Example 16 | 132 | >50,000 | −0.6 | −0.7 | 0.8 | 0.4 | 43 | 23 |
| Example 17 | 130 | >50,000 | −0.7 | −0.7 | 0.8 | 0.3 | 62 | 21 |
| Example 18 | 128 | >50,000 | −0.7 | −0.8 | 0.5 | 0.35 | 62 | 21 |
| Example 19 | 134 | >50,000 | −0.7 | −0.9 | 0.6 | 0.3 | 61 | 21 |
| Example 20 | 131 | >50,000 | −0.7 | −1.1 | 0.5 | 0.3 | 62 | 21 |
| Example 21 | 129 | >50,000 | −0.6 | −0.7 | 0.5 | 0.35 | 60 | 21 |
| Example 22 | 129 | >50,000 | −0.6 | −0.7 | 0.6 | 0.3 | 60 | 21 |

TABLE 5-continued

| | Light transmitting property (dB/km) | Cyclic Bending Times (times) | Heat resistance (dB) | Wet heat resistance (dB) | Bending loss (dB) | Pistoning (mm) | Adhesion force (N) | Resistance to bending (N) |
|---|---|---|---|---|---|---|---|---|
| Example 23 | 131 | >50,000 | −0.6 | −0.8 | 0.6 | 0.45 | 42 | 23 |
| Example 24 | 128 | >50,000 | −0.8 | −0.8 | 0.5 | 0.3 | 60 | 21 |
| Example 25 | 135 | >50,000 | −0.9 | −1.2 | 0.8 | 0.4 | 43 | 21 |
| Example 26 | 132 | >50,000 | −0.5 | −0.7 | 0.9 | 0.45 | 41 | 21 |
| Example 27 | 129 | >50,000 | −0.6 | −0.7 | 0.6 | 0.3 | 60 | 11 |
| Example 28 | 130 | >50,000 | −0.7 | −0.7 | 0.5 | 0.3 | 62 | 11 |
| Comparative Example 4 | 146 | 35,500 | −3.9 | −4.2 | 0.4 | 0.55 | 35 | 23 |
| Comparative Example 5 | 152 | >50,000 | −2.0 | −2.6 | 0.5 | 0.5 | 38 | 23 |
| Comparative Example 6 | 143 | 25,800 | −3.8 | −4.3 | 1.6 | 0.5 | 40 | 11 |
| Comparative Example 7 | 135 | >50,000 | −1.5 | −2.0 | 0.6 | 0.35 | 52 | 11 |
| Comparative Example 8 | 131 | >50,000 | −4.1 | −5.5 | 0.5 | 2.2 | 60 | 11 |

As described in Table 4, Example 1 showed excellent light transmitting property, cyclic bending times, heat resistance, wet heat resistance, bending loss, pistoning, and adhesion.

Examples 2 to 12 showed excellent light transmitting property, cyclic bending times, heat resistance, wet heat resistance, bending loss, pistoning, and adhesion.

Meanwhile, Comparative Examples 1 to 3 showed poor light transmitting property, cyclic bending times and the like.

As described in Table 5, Examples 13 to 26 showed excellent light transmitting property, cyclic bending times, heat resistance, wet heat resistance, bending loss, pistoning, and adhesion. Meanwhile, Comparative Examples 4 and 5 showed poor heat resistance, wet heat resistance, pistoning, adhesion and the like.

As described in Table 5, Examples 27 and 28 showed excellent light transmitting property, cyclic bending times, heat resistance, wet heat resistance, bending loss, pistoning, and adhesion. Meanwhile, Comparative Examples 6 to 8 showed poor heat resistance, wet heat resistance and the like.

INDUSTRIAL APPLICABILITY

Our plastic optical fiber and the plastic optical fiber cord can maintain good heat resistance and dimension stability for long period of time at an actual use temperature of 105° C.

In particular, the plastic optical fiber and the plastic optical fiber cord are suitably used as a plastic optical fiber cord for control part of an automobile, e.g., steering, brake, ABS unit, transmission, engine and the like.

The plastic optical fiber and the plastic optical fiber cord are suitable for automotive interior wiring or house wiring.

The invention claimed is:

1. A plastic optical fiber comprising a core and a cladding, wherein the cladding comprises at least one layer, and the cladding comprises a copolymer which comprises 10 to 35% by weight of ethylene, 45 to 69% by weight of tetrafluoroethylene, 20 to 45% by weight of hexafluoropropylene, and 0.01 to 10% by weight of a fluorovinyl compound represented by Formula (1):

$$CH_2=CX_1(CF_2)_nX_2 \quad (1)$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component.

2. The plastic optical fiber according to claim 1, wherein the fluorovinyl compound is a compound represented by Formula (2):

$$CH_2=CF(CF_2)_3H \quad (2).$$

3. The plastic optical fiber according to claim 1, wherein the cladding comprises two or more layers, and the cladding of an outermost layer comprises a copolymer which comprises 10 to 35% by weight of ethylene, 45 to 69% by weight of tetrafluoroethylene, 20 to 45% by weight of hexafluoropropylene, and 0.01 to 10% by weight of a fluorovinyl compound represented as follows:

$$CH_2=CX_1(CF_2)_nX_2$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component.

4. The plastic optical fiber according to claim 3, wherein the cladding of an innermost layer comprises a copolymer which comprises vinylidene fluoride and tetrafluoroethylene as a copolymer component.

5. The plastic optical fiber according to claim 4, wherein the cladding of the innermost layer comprises a copolymer which comprises 65 to 85% by weight of vinylidene fluoride and 15 to 35% by weight of tetrafluoroethylene as a copolymer component.

6. The plastic optical fiber according to claim 4, wherein the cladding of the innermost layer comprises a copolymer which comprises 35 to 60% by weight of vinylidene fluoride, 35 to 60% by weight of tetrafluoroethylene, and 5 to 30% by weight of hexafluoropropylene as a copolymer component.

7. The plastic optical fiber according to claim 4, wherein the cladding of the innermost layer comprises a copolymer which comprises 10 to 35% by weight of vinylidene fluoride, 45 to 75% by weight of tetrafluoroethylene, 10 to 30% by weight of hexafluoropropylene, and 1 to 10% by weight of perfluoroalkyl vinyl ethers as a copolymer component.

8. The plastic optical fiber according to claim 3, wherein the cladding of the innermost layer comprises a copolymer which comprises a perfluoroalkyl methacrylate unit.

9. The plastic optical fiber according to claim 8, wherein the cladding of the innermost layer comprises a copolymer which comprises 60 to 95% by weight of perfluoroalkyl methacrylate that is represented by formula:

$$CH_2=C(CH_3)—COO(CH_2)_m(CF_2)_nR$$

(wherein R represents a fluorine atom or a hydrogen atom, m is 1 or 2, and n represents an integer from 1 to 10) and 5 to 40% by weight of methyl methacrylate as a copolymer component.

10. The plastic optical fiber according to claim 1, wherein the cladding comprises two or more layers, and the cladding of an innermost layer comprises a copolymer which comprises 10 to 35% by weight of ethylene, 45 to 69% by weight of tetrafluoroethylene, 20 to 45% by weight of hexafluoropropylene, and 0.01 to 10% by weight of a fluorovinyl compound represented as follows:

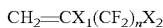

$$CH_2=CX_1(CF_2)_nX_2$$

(wherein $X_1$ represents a fluorine atom or a hydrogen atom, $X_2$ represents a fluorine atom, a hydrogen atom, or a hydrocarbon group, and n represents an integer from 1 to 10) as a copolymer component.

11. The plastic optical fiber according to claim 10, wherein the cladding of an outermost layer comprises a copolymer which comprises vinylidene fluoride and tetrafluoroethylene as a copolymer component.

12. The plastic optical fiber according to claim 11, wherein the cladding of the outermost layer comprises a copolymer which comprises 65 to 85% by weight of vinylidene fluoride and 15 to 35% by weight of tetrafluoroethylene as a copolymer component.

13. The plastic optical fiber according to claim 11, wherein the cladding of the outermost layer comprises a copolymer which comprises 35 to 60% by weight of vinylidene fluoride, 35 to 60% by weight of tetrafluoroethylene; and 5 to 30% by weight of hexafluoropropylene as a copolymer component.

14. The plastic optical fiber according to claim 11, wherein the cladding of the outermost layer comprises a copolymer which comprises 10 to 35% by weight of vinylidene fluoride, 45 to 75% by weight of tetrafluoroethylene, 10 to 30% by weight of hexafluoropropylene, and 1 to 10% by weight of perfluoroalkyl vinyl ethers as a copolymer component.

15. The plastic optical fiber according to claim 10, wherein the cladding of an outermost layer comprises a copolymer which comprises a perfluoroalkyl methacrylate unit.

16. The plastic optical fiber according to claim 15, wherein the cladding of the outermost layer comprises a copolymer which comprises 60 to 95% by weight of perfluoroalkyl methacrylate that is represented by formula:

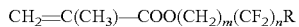

$$CH_2=C(CH_3)-COO(CH_2)_m(CF_2)_nR$$

(wherein R represents a fluorine atom or a hydrogen atom, m is 1 or 2, and n represents an integer from 1 to 10) and 5 to 40% by weight of methyl methacrylate as a copolymer component.

17. The plastic optical fiber cord according to claim 1, further comprising at least one more coating layers on an outer periphery of the cladding.

18. The plastic optical fiber cord according to claim 17, wherein the coating layer comprises a thermoplastic resin as a main component.

19. The plastic optical fiber cord according to claim 18, wherein the thermoplastic resin is at least one selected from the group consisting of a polyolefin resin, a polyamide resin, polyvinyl chloride, a polyester resin, a polyester elastomer, a polyamide elastomer, a polyolefin elastomer, a cross-linked polyolefin, a polyurethane elastomer resin, and an ethylene-vinyl acetate copolymer.

20. The plastic optical fiber cord according to claim 19, wherein the polyolefin is polyethylene or polypropylene.

21. The plastic optical fiber cord according to claim 17, wherein the coating layer of an innermost layer is a coating layer comprising polyamide as a main component.

22. The plastic optical fiber cord according to claim 17, wherein the coating layer comprises at least two layers, and the coating layer of an outermost layer comprises polyamide and/or a thermoplastic elastomer as a main component.

23. The plastic optical fiber cord according to claim 17, wherein pistoning after heat treatment at 105° C. for 24 hours is ±0.5 mm or less.

24. The plastic optical fiber cord according to claim 17, wherein adhesion force between the plastic optical fiber and the coating layer is 30 N or more at 30 mm length.

* * * * *